United States Patent [19]

Wolff

[11] 4,007,584
[45] Feb. 15, 1977

[54] ADJUSTABLE PITCH TOOL BAR ASSEMBLY FOR TRACK PRESSES

[76] Inventor: William H. Wolff, 216 Atherton Ave., Atherton, Calif. 94025

[22] Filed: Mar. 22, 1976

[21] Appl. No.: 668,977

[52] U.S. Cl. .................................. 59/11; 29/283
[51] Int. Cl.² .............................................. B21L 5/00
[58] Field of Search ............ 29/283, 282, 251, 255; 269/203; 59/7, 11

[56] References Cited
UNITED STATES PATENTS

| | | | |
|---|---|---|---|
| 307,439 | 11/1884 | Corbett | 269/203 X |
| 3,075,346 | 1/1963 | Quarve et al. | 59/7 |
| 3,939,648 | 2/1976 | Cullen | 59/11 |

Primary Examiner—James L. Jones, Jr.
Attorney, Agent, or Firm—Flehr, Hohbach, Test, Albritton & Herbert

[57] ABSTRACT

An adjustable pitch tool bar assembly for use in track presses employed in the assembly and disassembly of drive chains for ground engaging shoes of track laying tractors. The adjustable pitch tool bar assembly includes a tool bar track for carrying a pair of tool blocks which mount bushing and pin tools and slide on the tool bar track to accommodate different track pitches.

3 Claims, 8 Drawing Figures

ADJUSTABLE PITCH TOOL BAR ASSEMBLY FOR TRACK PRESSES

BACKGROUND OF THE INVENTION

This invention relates generally to tool bars for use in track presses and more particularly to an adjustable pitch tool bar assembly including a tool bar track and tool blocks slidable on said track which receive bushing and pin tools to engage pins and bushings of associated drive chains.

Crawler or track laying tractors are widely used, particularly for heavy duty work. The tracks employed in such tractors include ground engaging shoes or grousers removably secured to a drive chain driven over an idler sprocket by means of a driven sprocket. The drive chain includes a plurality of sections each adapted to receive a shoe. Each section includes a pair of side links spaced apart to receive the sprocket wheel teeth. Each section is pivotally joined to the next adjacent section by means of a cross pin and bushings. The side links of each section are relatively widely spaced at one end to receive the relatively closely spaced ends of the next side link. Bushings are press fit into the closely spaced ends while pins are press fit into the widely spaced ends of each pair to form the pivotable joint between sections.

Because of the nature and operation of tractors, the tracks are subjected to rapid wear and require frequent repair. Generally, for repair, the track is removed from the tractor by removal of a master pin and the track is laid out. In larger tracks the shoes or grousers are often removed to expose the drive chain. In smaller tracks, they are not always removed. In either case, the chain is then mounted on a track press and moved to present the links in succession to a work station which includes a jaw for holding spaced adjacent bushings of the chain in position as hydraulic rams move spaced pin and bushing tools mounted on a tool bar into cooperative relationship with the pins and bushings to remove the pins and bushings from the links to release the side links for disassembly. During assembly, the chain is moved in the opposite direction and the pins and bushings are inserted by spaced pin and bushing tools.

The track press generally includes hydraulically driven tools on each side of the chain whereby to engage and remove or insert the pins and bushings from each side of the links in succession. The links are restrained from side movement by a jaw which includes spaced U-shaped or V-shaped grooves for receiving the bushings and orienting each section in a position whereby the advancing tools register with the pins and bushings. The jaw may be a retractable jaw which is retracted to advance the chain one section at a time to present the next section to the station or may be a fixed jaw where the chain is moved upwardly, advanced and then lowered to place the bushings in engagement with the jaw grooves. A typical track press with retractable jaws is described in U.S. Pat. No. 3,075,346.

There are many models and sizes of track laying tractors manufactured by each of a number of manufacturers. The track size differs for different models, sizes and manufacturers. As a result, different sizes and pitch of pin and bushings tools are required to provide the proper pitch and size to engage the pins and bushings for the variety of tracks encountered. Different heights of the tool centerline are also required. Present day tool bars do not provide a large choice of pitches and sizes. In Pat. No. 3,075,346, there is shown and described a tool bar including a T-groove and T-bolts which hold the bushing and pin tools and which provide for adjusting the pitch. In order to adjust the pitch the T-bolts are then tightened. The height of the tools is fixed. Tool bars are also available having spaced pairs of tool mounting holes disposed on a centerline. A different tool bar is required for different size chains since the height centerline of the pins and bushings will be dependent thereon.

More recently there has been provided a multipitch tool bar including a plurality of pairs of tool mounting holes and which also includes means for mounting the bar on the track press tool head at different heights. The multi-pitch tool is described in U.S. Pat. No. 3,939,648, Feb. 24, 1976.

OBJECTS AND SUMMARY OF THE INVENTION

It is a general object of the present invention to provide an adjustable pitch tool bar assembly which can be used for different chain sizes, types and pitches.

It is another object of the present invention to provide a tool bar assembly which can readily position tools at different predetermined heights and pitches.

It is a further object of the present invention to provide a tool bar assembly including a pair of tool blocks which engage and slide on a tool bar track and which are adopted to receive the pin and bushing tool holding screws.

The foregoing and other objects of the invention are achieved by a tool bar assembly which includes a tool bar track adopted to be mounted on a track press tool head and a pair of tool blocks slidably mounted on said track and each including pin and bushing tool mounting holes whereby when they are moved along the track the pin and bushing tools accommodate a plurality of track pitches.

DESCRIPTION OF PREFERRED EMBODIMENTS

Figure 1:
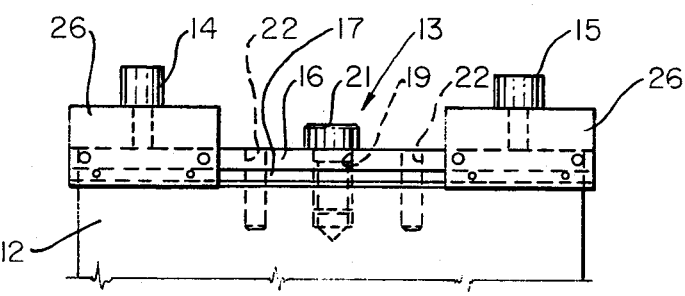
FIG. 1 is a partial view showing the adjustable pitch tool bar assembly mounted on a track press tool head.
Figures 3, 4:
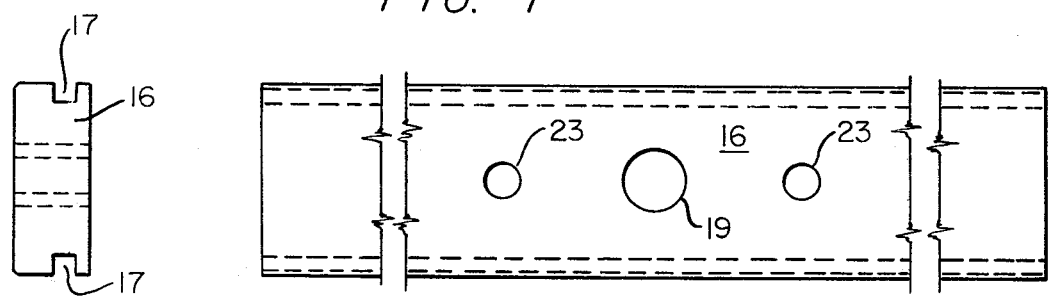
FIG. 3 is a plan view of the tool bar track.
FIG. 4 is a side elevational view of the tool bar track.
Figure 5:
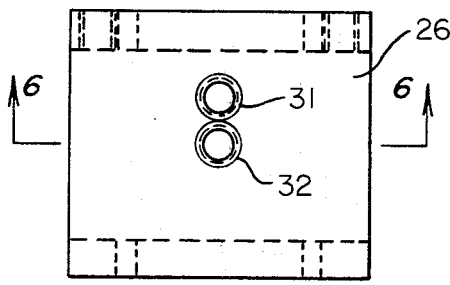
FIG. 5 is a plan view of a tool block for use in the adjustable pitch tool bar assembly.
Figure 7:
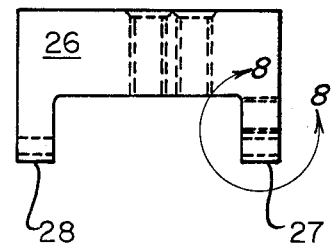
FIG. 7 is an end view of the tool block.
Figure 6:
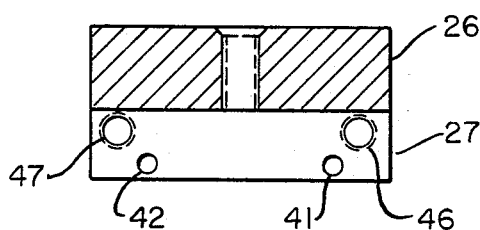
FIG. 6 is a sectional view taken along the line 6—6 of FIG. 5.
Figure 8:
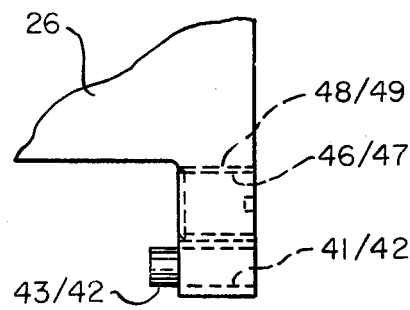
FIG. 8 is an enlarged view of the portion 8—8 of FIG. 7.

Referring to FIG. 1, there is shown a hydraulically driven track press tool head 12 adapted to accommodate a tool bar assembly 13 with associated pin and bearing tools 14 and 16. In practice a track press includes opposed heads which are advanced to bring the tools 14 and 16 into engagement with the pin and bushing of an associated chain which is carried by the track press. The chain is advanced opposite the heads to thereby remove or insert pins and bushings of successive track links.

Figure 2:
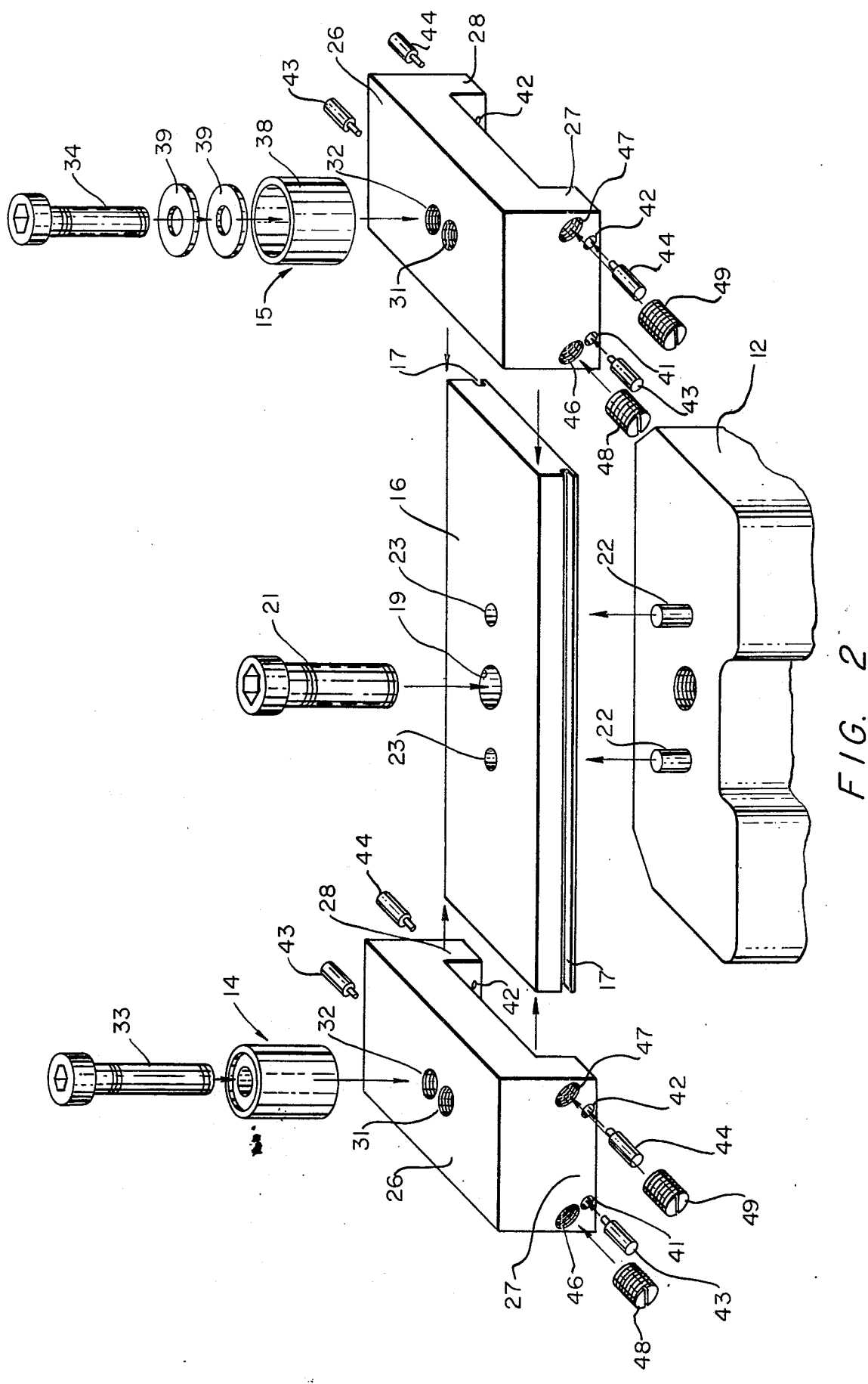
FIG. 2 is an exploded view of the adjustable pitch tool bar assembly in accordance with the present invention.

The adjustable pitch tool bar assembly in accordance with the present invention includes a tool bar track 16 which is in the form of an elongated metal block having a pair of grooves or slots 17 on opposite lower edges. As will presently become apparent rather than grooves 17 there may be provided a stepped portion which serves the same purpose. The track 16 includes a hole or opening 19 which is adapted to receive bolt 21, FIGS. 1 and 2, to mount a tool bar upon a track press tool head 12. Spaced locating pins 22 engage spaced holes 23 to position the track on the tool head 12. The bar is securely held against the tool head in engagement with the pins by means of the bolt 21 extending through hole 19 and engaging tool head 12.

Tool blocks 26 are carried by the track for slidable movement therealong. The blocks 26 are U-shaped whereby the legs of 27, 28 straddle the sides of the tool bar track. The blocks 26 include a pair of spaced tapped holes 31 and 32 which are disposed at the different vertical heights and are adapted to threadably receive bolt 33 and 34 to mount the tool pin 14 and the bushing tool 15 on the tool block. The bushing sleeve 36 fits over a bushing insert (not shown) and is secured by bolt 34. The height of the bushing insert can be adjusted by means of the spacers 39 whereby the end of the bushing sleeve can extend outwardly beyond the bushing insert to define a rim for engaging an associated chain bushing. By mounting the tool pin assembly 14 and bushing assembly 15 in different pairs of holes 31 and 32, different pin tool and bushing tool heights are provided.

The tool blocks are adapted to slide along the tool bar track to accommodate tracks having different pitches. The depending portions 27 and 28 of the tool block each include a pair of spaced holes 41 and 42 which are adapted to receive guide pins 43 and 44 which ride in the groove 17 and hold the tool blocks 26 on the tool bar or track.

In addition, there are provided a pair of tapped holes 46 and 47 on one leg 27. These tapped holes are adapted to receive set screws 48 and 49 respectively which are tightened to lock the tool blocks in position along the track.

Thus, the pair of spaced blocks can be adjusted along the track to provide the required pitch to satisfy and engage the associated track pin and bushing. The pair of holes on the tool block provide for two different height adjustments. The tool bar provides any desired pitch adjustment which can be accommodated in the length of the track. The tool assembly can be used on a variety of tracks by merely replacing the pin and bushing tools.

Thus, it is seen that a single assembly can be used to adapt to a wide variety of track pitches and heights and types thereby economizing the amount of material used for tool bars, the inventory of tool bars required, and the labor involved in set up of the track press.

I claim

1. An adjustable pitch tool bar assembly for mounting on the movable head of a track press of the type adapted to receive a track chain having pins and bushings and present the chain to the movable head for removing or inserting the track pins and bushings during assembly and disassembly of a track comprising: an elongated tool bar track, said tool bar track including means for receiving a mounting bolt for securing the bar to the movable head, a pair of U-shaped tool blocks mounted on said tool bar track with their legs straddling the track for independent movement therealong, means carried by said legs cooperating with the track for holding said blocks on said track, pin and bushing tool assemblies including securing means, and means on said blocks for receiving said pins and bushing tool securing means to hold said pin and bushing tool assemblies whereby the blocks may be moved along the track to adjust the spacing of the pin and bushing tools to accommodate various track pitches.

2. An adjustable tool pitch bar assembly as in claim 1 wherein said track includes grooves extending along the sides and said means carried by said legs cooperating with the track include pins extending into said grooves.

3. An adjustable tool pitch bar assembly as in claim 1 wherein at least one of said legs includes means for engaging the track to lock the block onto the track.

* * * * *